M. A. DROITCOUR.
PLATE MAKING MACHINE.
APPLICATION FILED AUG. 6, 1909.
960,006.
Patented May 31, 1910.
8 SHEETS—SHEET 8.
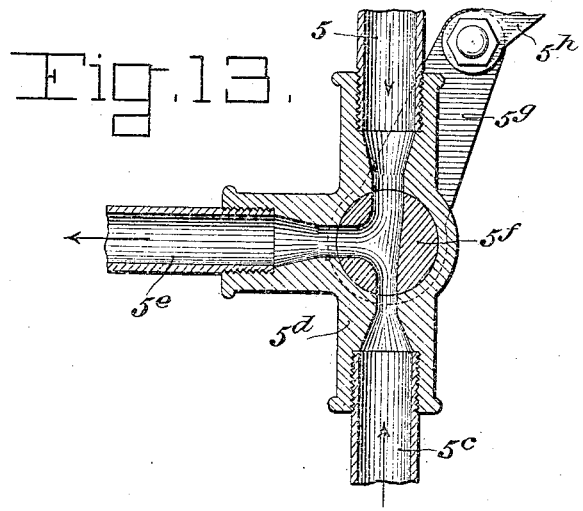
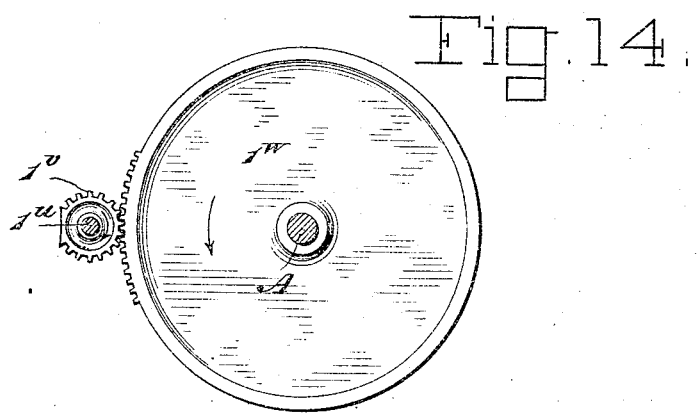
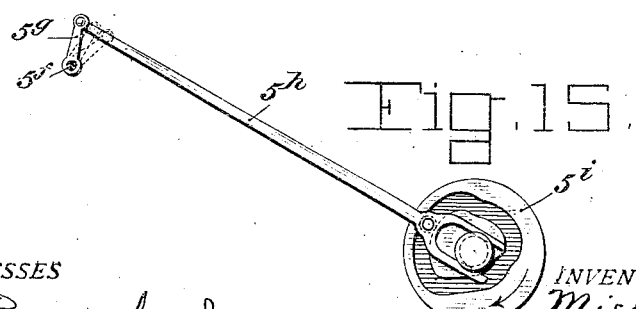

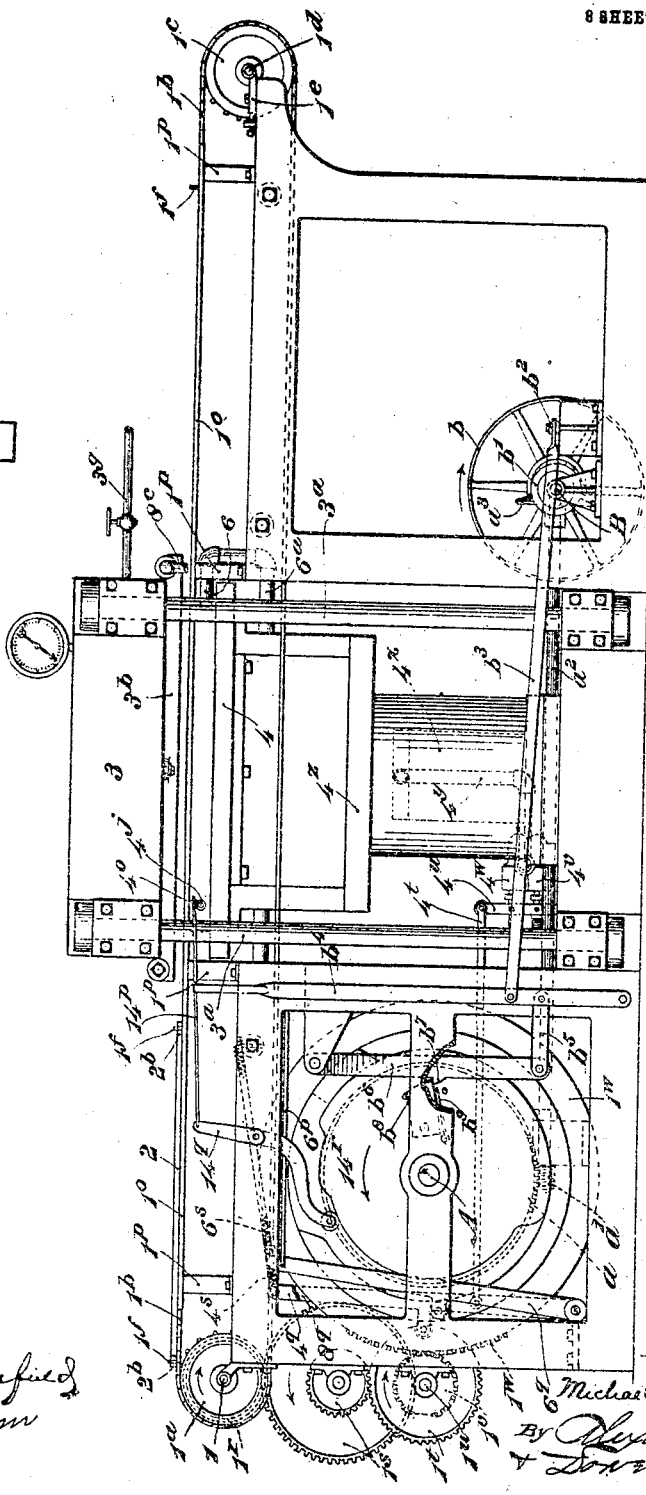

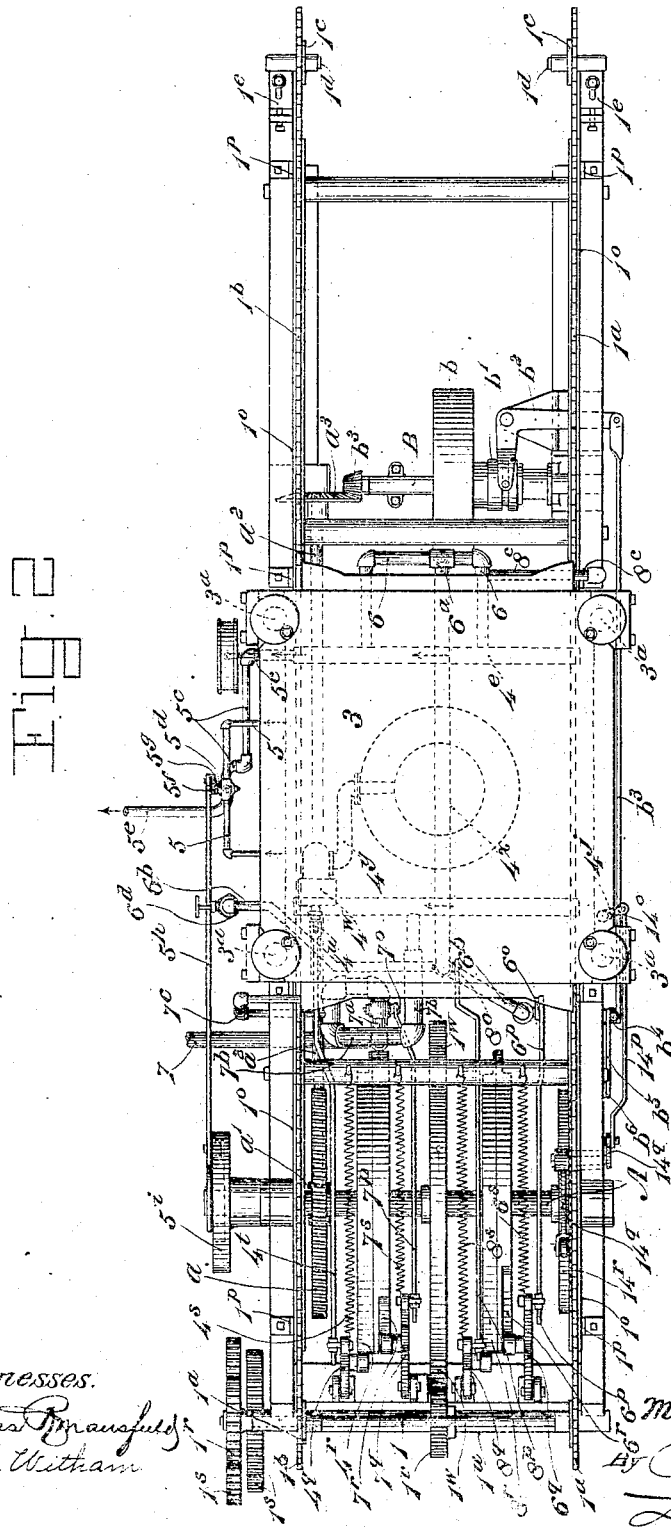

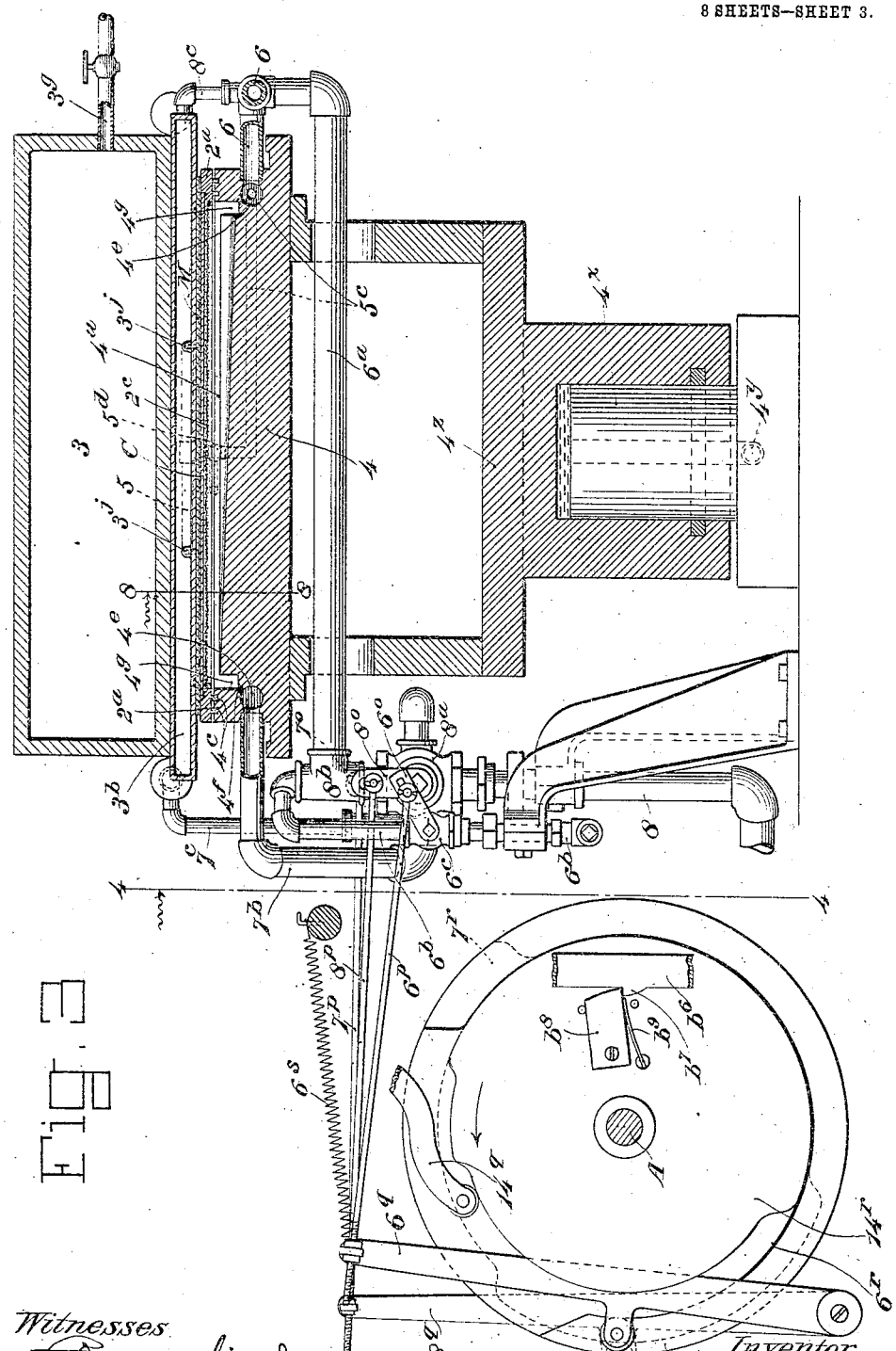

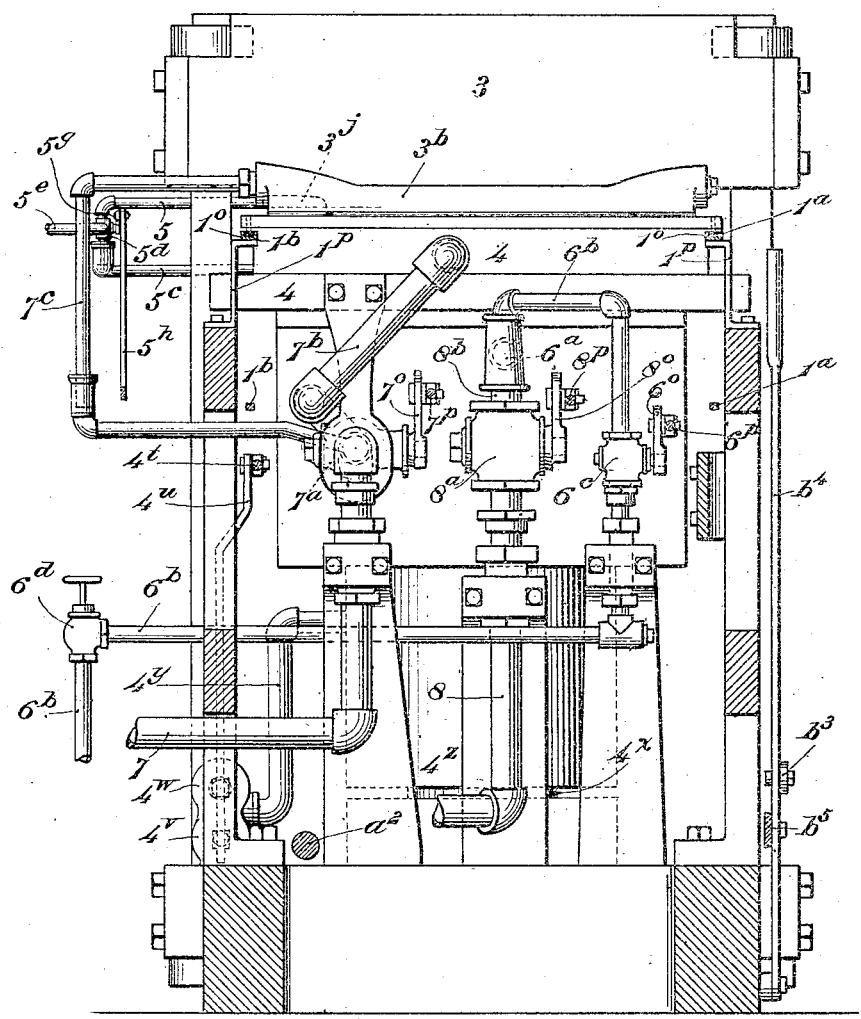

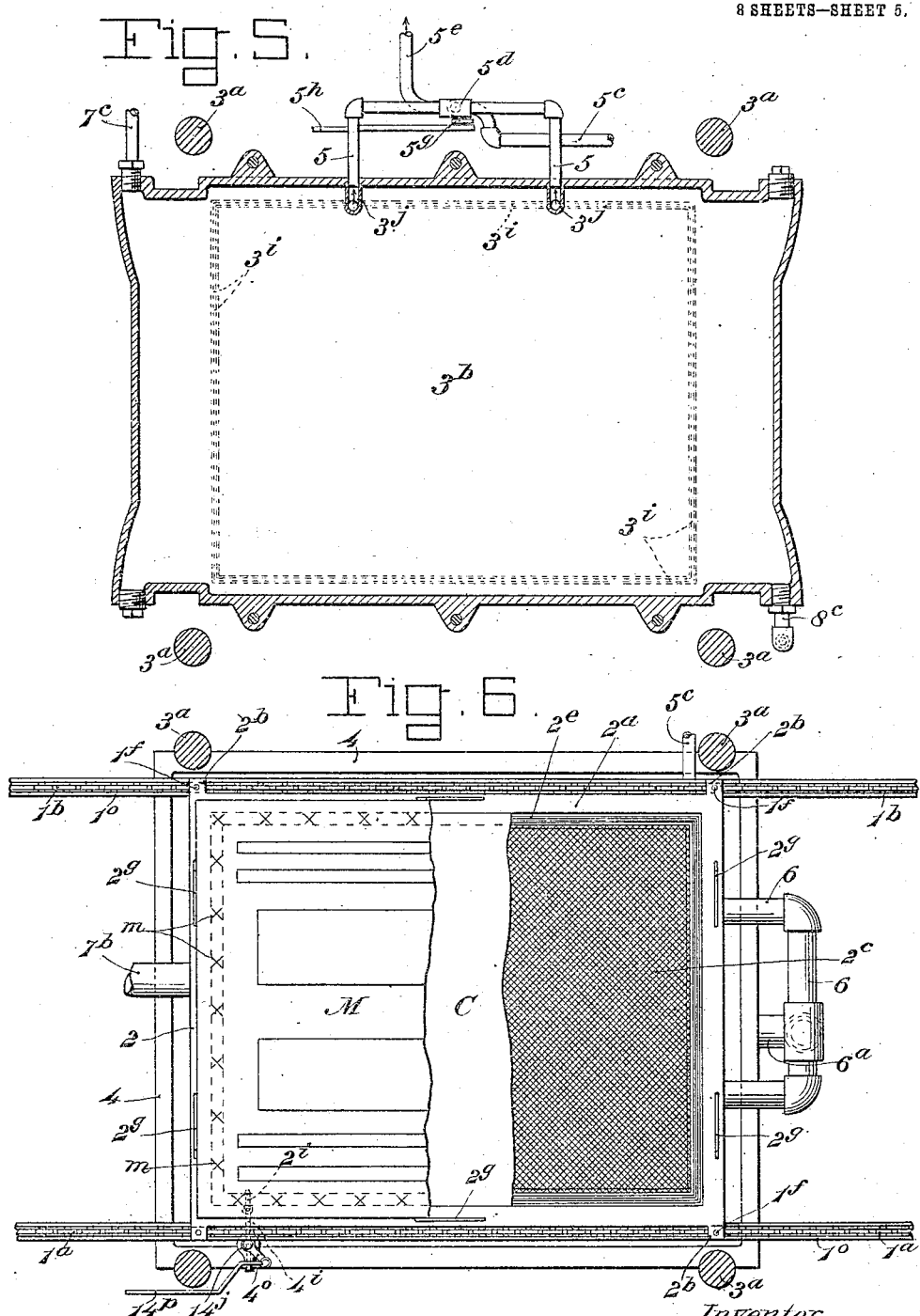

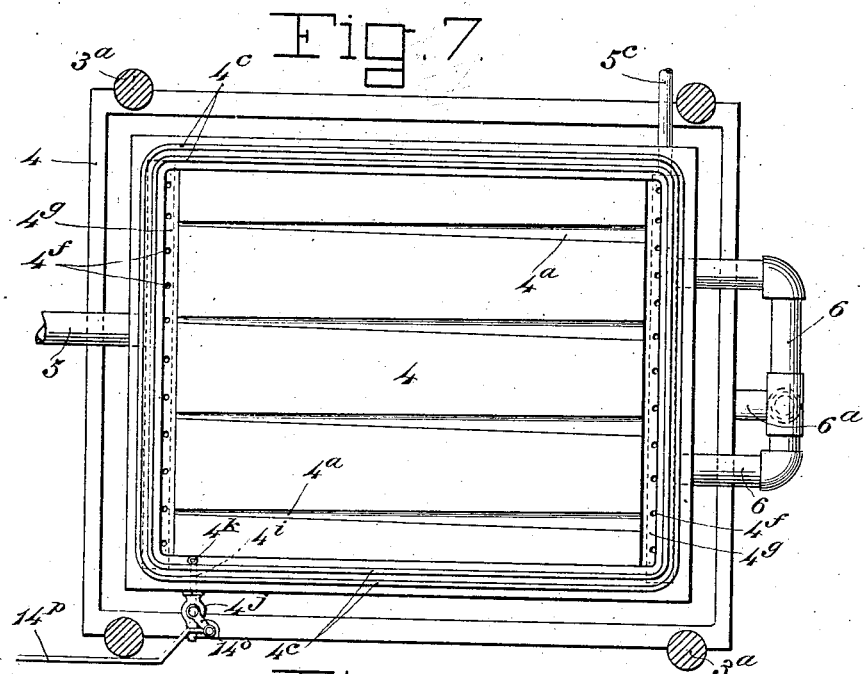
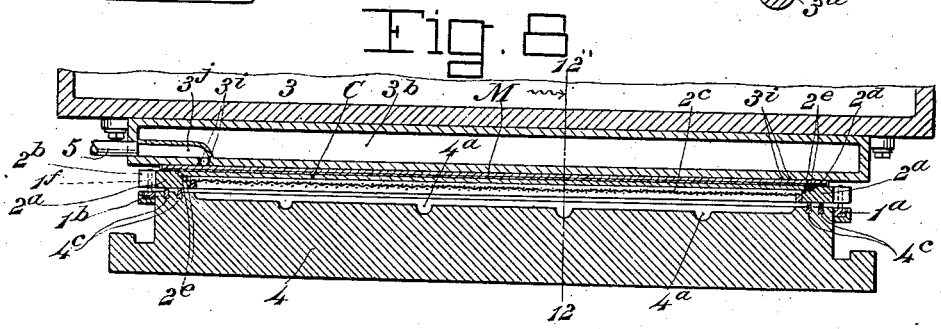
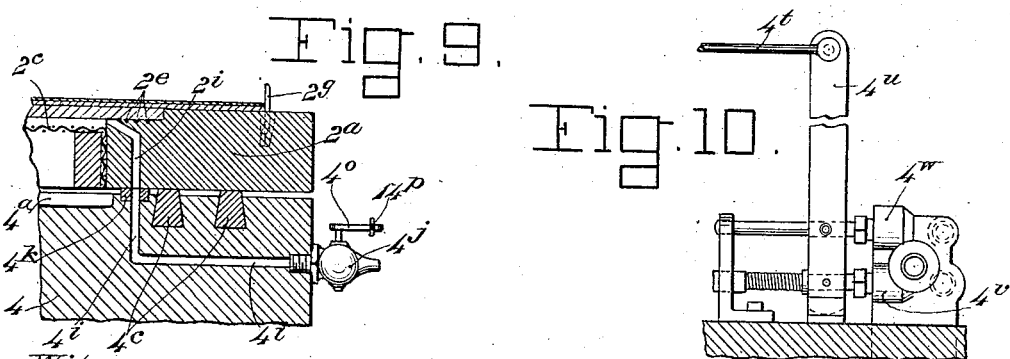

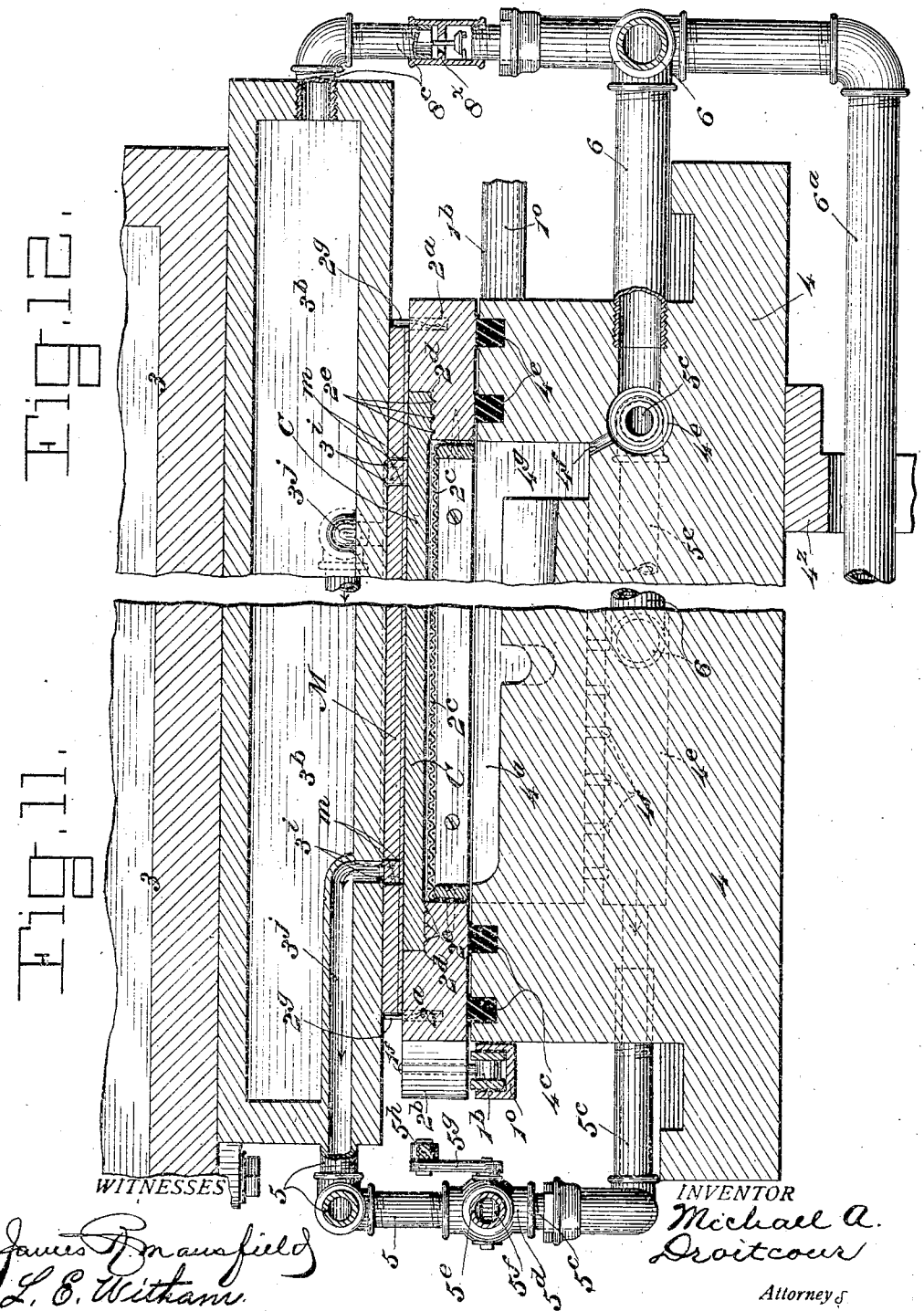

UNITED STATES PATENT OFFICE.

MICHAEL A. DROITCOUR, OF CHICAGO, ILLINOIS, ASSIGNOR TO MIEHLE PRINTING PRESS AND MANUFACTURING COMPANY, OF CHICAGO, ILLINOIS, A CORPORATION OF ILLINOIS.

PLATE-MAKING MACHINE.

960,006.

Specification of Letters Patent.   Patented May 31, 1910.

Application filed August 6, 1909.   Serial No. 511,641.

*To all whom it may concern:*

Be it known that I, MICHAEL A. DROITCOUR, of Chicago, in the county of Cook and State of Illinois, have invented certain new and useful Improvements in Plate-Making Machines; and I hereby declare that the following is a full, clear, and exact description thereof, reference being had to the accompanying drawings, which form part of this specification.

This invention is a novel machine for making printing plates of plastic material, such as celluloid, and the objects of the invention are (1) to provide a machine capable of producing such plates perfectly and rapidly; (2) to prevent formation of any imperfections on the printing surface of the plate by reason of air bubbles or gas trapped or formed between the surfaces of the matrix and plastic plate prior to or during the formation of the printing surface; (3) to provide means for forming air and gas tight seals between the outer margins of the plate and matrix during the plate forming operation, and also between the outer margins of the frisket and the pressure and cooling chamber during the plate forming operation; (4) to provide means for supporting the preliminarily heated plate prior to the pressing operation; (5) to provide means for rapidly cooling the plate after the plate has been pressed against the matrix and conformed thereto; and (6) to provide means whereby the various operations on the plate can be automatically controlled by the machine itself, so that when the matrix and material are properly placed in the machine it will produce a plate automatically, and deliver the same therefrom in perfect condition.

In the accompanying drawings I have illustrated one practical form of the apparatus, not attempting to give accurate proportions of parts therein however; and I will describe the invention as embodied in said machine and summarize in the claims the parts and combinations of parts for which protection is desired.

In said drawings: Figure 1 is a side elevation of the complete machine. Fig. 2 is a top plan view thereof. Fig. 3 is an enlarged detail longitudinal section showing the plate in process of formation. Fig. 4 is a section on line 4—4, Fig. 3, looking in the direction of the arrows. Fig. 5 is a horizontal longitudinal section through the upper cooling plates. Fig. 6 is a detail plan view partly broken of the matrix blank and frisket in position for sealing. Fig. 7 is a detail sectional view showing the lower presser plate with the frisket removed. Fig. 8 is a detail transverse section on line 8—8, Fig. 3. Fig. 9 is a detail section enlarged on line 9—9, Fig. 8. Fig. 10 is a detail view of the ram valves. Fig. 11 is an enlarged detail transverse sectional view showing the position of parts during the formation of a plate. Fig. 12 is an enlarged detail longitudinal section of the same parts. Fig. 13 is a detail sectional view of the vacuum controlling valves. Fig. 14 is a detail view of the gearing for operating the frisket carrying chains. Fig. 15 is a detail view of the vacuum valve cam connections.

The machine comprises a main frame, of any suitable construction, having a shaft 1 at one end carrying a pair of sprocket wheels $1^a$ over which run sprocket chains $1^b$ that extend parallel, and longitudinally of the machine, to and over sprocket wheels $1^c$ journaled on studs $1^d$ attached to brackets $1^e$ adjustably secured to the frame, as indicated in Figs. 1 and 2 of the drawings, so that each of the chains $1^b$ can be kept under proper tension. These sprocket chains $1^b$ are provided at suitable intervals with pins $1^f$ for engagement of a matrix carrier or frisket 2, which can be laid upon and between the upper parallel runs of chains $1^b$, to be moved thereby into position between the fixed and movable pressing members (3 and 4) that are arranged respectively above and below the upper runs of the chains $1^b$. The upper runs of chains $1^b$ are preferably supported by channel irons $1^o$ mounted on brackets $1^p$, as indicated in the drawings, to prevent the chains sagging under the weight of the frisket.

The upper member of the press comprises a hollow casting 3, which is preferably rectangular in plan, mounted upon upright posts or rod $3^a$ attached to the side frames of the machine, and by which the member 3 is supported horizontally above the upper runs of the chains 1ᵇ. On the under side of the upper member 3 is a hollow casting 3ᵇ which is used both for heating and cooling the plates, as hereinafter explained.

The lower press member comprises a hollow casting 4 which has a recess or chamber 4ᵃ in its upper side, approximately corresponding in area to the size of the largest impression surface to be formed; or the inside of the frisket frame; the recess 4ᵃ is used successively as a vacuum chamber, a pressure chamber, and a cooling chamber, during the process of forming the plates, as hereinafter described; said recess 4ᵃ being closed air-tightly during the process of making a plate, by means of the frisket frame, the plate and matrix, and the bottom of the casting 3ᵇ, as hereinafter explained.

The casting 4 is supported upon the movable member 4ᶻ of a ram of any suitable construction. As indicated in the drawings, the stationary member 4ˣ of this ram is fixed to the base of the machine, and fluid can be admitted into the working chamber between the members 4ᶻ, 4ˣ, by a pipe 4ʸ, as indicated in Fig. 3 of the drawings, from any suitable supply of fluid under pressure controlled by valves 4ᵛ and 4ʷ (Fig. 10), so that the plate 4 can be raised and lowered, as hereinafter explained. The upper margin of the casting 4 around chamber 4ᵃ is provided with gaskets 4ᶜ which are adapted to contact with the under side of the frisket frame 2ᵃ when the latter is brought into position over the casting 4, as shown in Figs. 11 and 12.

The frisket 2 comprises a frame 2ᵃ which is preferably rectangular, and is of a width approximating the distance between the upper runs of the chains 1ᵇ; said frame 2ᵃ is provided with perforated ears 2ᵇ on its sides which are adapted to engage with the pins 1ᶠ on chains 1ᵇ, see Figs. 1 and 6, and enable the frisket to be moved by the chains between the press members. Different sized friskets may be provided for different sized plates. Within the frisket frame 2ᵃ is secured a wire netting 2ᶜ, in any suitable manner, preferably lying slightly below the upper surface of the frame, so that said netting will not be embedded in the material of the plate when the latter is formed. This wire prevents the celluloid or composition when hot from sagging improperly or dangerously before pressure is applied thereto, and also prevents its creasing when the pressure is applied. The frisket frame 2ᵃ is shouldered as at 2ᵈ to limit the size of the material used for the plate, which material should be cut of a size to come neatly within the shoulder 2ᵈ of the frame. This shoulder portion is provided with several small parallel grooves, indicated at 2ᵉ in the drawings, which will be covered by the margins of the plate of material C when the latter is in position on the frisket; and when the press members are closed, as in Figs. 3, 11 and 12, the soft material of the plate C will fill these grooves and form an air-tight closure between the under side of the plate C and the frisket frame 2ᵃ so that the material will be prevented when under the later formative pressure from squeezing out over the edge of the frame, and so that the pressure fluid will be confined within the pressure chamber 4ᵃ.

A plate C of suitable material, such as celluloid, preferably preliminarily heated, is placed on the frisket, as indicated in Figs. 3, 6, 9, 11 and 12, over the screen 2ᶜ; then a suitably formed matrix M is placed upon the frisket over the celluloid plate. The plate C is positioned by the shoulders 2ᵈ in the frame; and the matrix M is positioned by the usual setting springs 2ᵍ attached to the edges of the frisket frame. Then the chains 1ᵇ are actuated so as to move the frisket with the plate and matrix into position between the upper and lower pressure members 3 and 4 and the chains stop. The members 3 and 4 are then closed upon the frisket, as indicated in Figs. 2 and 8. In closing, clamping pressure is applied to the frisket frame, and the margins of the matrix M which lie on the upper surface of the frisket frame, and also to the outer margins of plate C, as indicated at 2ᵉ Figs. 11 and 12.

An air-tight closure is made between the frisket frame and the upper side edges of casting 4 by the gaskets 4ᶜ. A further air-tight joint is made between the lower side of the plate C and the frisket frame by the grooves 2ᵉ. An air-tight joint is also made between the frisket frame 2ᵃ and the under side of the casting 3ᵇ by the compression of the outer margins of the matrix M between the frisket frame and casting 3ᵇ.

Preferably the plate C is heated to a semi-plastic condition before it is placed on the frisket. By previously heating the plate I am enabled to tightly close the press members upon the matrix and plate as described, and to thereafter form the printing surface on the plate without injury to the matrix, as the plastic plate will readily conform to the surface of the matrix without injury thereto, which it would not do if the plate was not plastic.

When the press members are closed, as indicated in Figs. 3, 8, 11 and 12, the recess 4ᵃ will be closed air-tightly on its upper side, and it then forms a closed chamber which is used successively as a vacuum chamber, a pressure chamber and a cooling chamber. The upper presser member 3 may be continually heated by live steam which is admitted thereto from any suitable generator through inlet pipe 3ᵍ, and the casting $3^b$ is heated sufficiently by conduction to maintain plate C in a plastic condition during the formation thereof into a printing plate.

After the parts are closed as described, and shown in Fig. 11, the air is exhausted, as hereinafter described, from the chamber $4^a$ and between the matrix M and the casting $3^b$ prior to the final compressing operation, or actual formation of the printing surface on the plate C by pressing the same against the matrix. The air is exhausted from between the casting $3^b$ and matrix by means of suitable suction channels or grooves $3^i$ formed in the lower surface of the casting $3^b$, which channels are adapted to be closed on their under side by the matrix M, see Figs. 3, 11 and 12. These channels $3^i$ communicate at one or more points with passages $3^j$ formed in the walls of casting $3^b$ (Figs. 11 and 12) which passages connect with a suction pipe 5; said suction pipe being in turn connected with any suitable exhausting apparatus (not shown) capable of producing a high vacuum. Air is also exhausted from between the matrix M and the plate C through slits $m$ in the matrix (see Figs. 6 and 11) which slits may be readily made in the matrix by cutting it with a sharp knife or instrument, as indicated in Fig. 6 of the drawings. These slits being adapted to register with the grooves or channels $3^i$ in the under side of the casting $3^b$ (see Fig. 11) and consequently when vacuum is produced in the channels $3^i$ there will be a suction of air or exhaustion of air between the surfaces of the matrix M and the plate C. Such suction will draw plate C into close contact with the matrix and will prevent formation of pockets of air or gas therebetween. Air may also be exhausted from the chamber $4^a$ (when the parts are closed) by means of a pipe $5^c$, see Figs. 6, 7, 11 and 12, which communicates with the end of a bore $4^e$ in the end of the casting 4 below the bottom of chamber $4^a$, which bore $4^e$ is in turn connected with the chamber $4^a$ by means of small perforations $4^f$ connecting with a transverse channel $4^g$ at the end of the chamber $4^a$ as shown.

The exhaust or vacuum pipes 5, $5^c$, are preferably connected to opposite inlets of a three-way valve $5^d$ (Fig. 13) the common outlet of which is connected by a pipe $5^e$ to the exhausting apparatus or vacuum producer. The valve $5^d$ is preferably a three-way valve and its plug $5^f$ is so formed that it can be shifted so as to cut off communication between pipes $5^c$ and $5^e$ before closing communication between pipes 5 and $5^e$. Valves of this kind are well known and any suitable construction thereof may be employed.

Preferably suction is continually maintained above and between the matrix M and plate C during the operation of forming the printing surface on the plate. Communication between pipes $5^c$ and $5^e$ is cut off before the actual formative pressure on the plate begins. The vacuum in chamber $4^a$ is then destroyed by admitting air thereto through a passage $4^i$, see Figs. 7 and 9, which is opened and closed at the proper time as hereinafter described. The passage $4^i$ communicates with a passage $2^i$, in the frisket frame, which leads upward to a point above the screen $2^c$. A packing ring $4^k$ may be placed at the end of the passage $4^i$ so as to make an air-tight joint between the passages $2^i$, $4^i$, when the parts are under pressure. The vacuum is established primarily above and below the plate C as above described in order to insure the removal of all air from between the plate and the matrix. If the vacuum was applied only to the upper side of the plate the atmospheric pressure in chamber $4^a$ below the plate would lock the plate to the matrix and might produce air pockets therebetween; but by forming the vacuum below at the same time that it is formed above, any such action is prevented and the plate C is brought fully and closely against the matrix; and when the valve $4^j$ is opened danger of formation of any air pockets has been eliminated.

When the valve $4^j$ is opened, air enters comparatively gradually, into the chamber $4^a$ and owing to the vacuum above the plate C the latter is held evenly and uniformly against the matrix, and the matrix is brought uniformly into contact with the under surface of the casting $3^b$, and the vacuum being maintained above and between the matrix and plate C the formation of any air pockets therebetween is prevented. Thereafter the valve $4^j$ is closed and fluid under pressure—preferably air—is admitted into the chamber $4^a$ through pipe 6 which connects with the bore $4^e$ at the rear end of the chamber $4^a$, see Figs. 2, 3, 6, 7, and 12; said pipe 6 communicating with a common pipe $6^a$. The pipes 6 and $6^a$ are really drain pipes, but are also used for the purpose of conducting pressure fluid, or air, into the chamber $4^a$. The pressure fluid is supplied to pipe $6^a$ by a pipe $6^b$ connected to a suitable reservoir or supplier (not shown); and pipe $6^b$ is controlled by a valve $6^c$, which can be operated automatically as hereinafter described. A hand valve $6^d$ may be put in pipe $6^b$ (Fig. 4) at a convenient point to enable the pressure to be cut off when the automatic valve is being repaired or packed.

A very high pressure, say 200 pounds to the square inch, is maintained in chamber $4^a$ during the formation of the printing surface on the plate during which time of course all other outlets or inlets to this chamber 4ª are closed. This pressure is sufficient to produce a perfect printing surface on the face of the plastic plate C from the matrix M. After the printing surface is properly formed the plate C is cooled by admitting water into the casting 3ᵇ and chamber 4ª.

Water is admitted into the hollow casting 3ᵇ through a pipe 7ᶜ which connects with a pipe 7, see Figs. 4 and 5. Water can be simultaneously supplied to the chamber 4ª by a pipe 7ᵇ, also connected with pipe 7. A valve 7ª is interposed between the pipes 7ᶜ and 7ᵇ and the pipe 7. The pipe 7 is preferably connected with a water reservoir or tank (not shown) in which a pressure is maintained corresponding to that supplied by pipes 6ᵇ. This valve 7ª is preferably a two-way valve, of any suitable construction which will close communication between pipes 7ᶜ and 7ᵇ simultaneously with the cutting off of the water. The valve 7ª may be mechanically operated as hereinafter described. The pipe 7ᶜ is preferably very much smaller than pipe 7ᵇ. The water is preferably admitted into chamber 4ª while the air pressure is maintained therein. Valve 6ᶜ should be closed before or simultaneously with the opening of the water valve 7ª so as to hold the pressure against the plate. In order to cause the water to flow properly into chamber 4ª, the small pet valve 4ʲ is opened and the water flows into chamber 4ª as fast as the air is allowed to escape therefrom through valve 4ʲ, so that the pressure is still maintained against the underside of the plate C.

The air is removed from chamber 4ª through channel 2ⁱ from a point above the screen 2ᶜ, or at the highest point of the chamber, so that no air can be trapped under the bottom of the plate, and the water is admitted directly and fully against the bottom of the plate and there will be no air to hold it out of contact therewith and the plate will be chilled uniformly.

In order to further expedite the flow of water into the chamber 4ª and the cooling chamber 3ª, the outlet valve 8ª in the main drain pipe 8 is opened; this drain pipe 8 is connected beyond the valve 8ª by joint 8ᵇ with the pipe 6ª; and pipes 6 are connected, beyond valve 8ª, by a pipe 8ᶜ with the chamber 3ᵇ, see Figs. 3, 5 and 12, so that casting 3ᵇ will be drained into pipe 8 through pipes 8ᶜ, 6, 6ª and 8ᵇ (see Figs. 3, 4 and 12). A check valve 8ˣ is placed in pipe 8ᶜ to prevent air or pressure fluid entering casting 3ᵇ when admitted into pipes 6 as above described. When the drain valve 8ª is opened there will be a decrease of pressure in chamber 4ª, and a correspondingly more rapid flow of water thereinto, and into casting 3ᵇ, filling the chambers and cooling the plate rapidly. This finishes the operation of making the plate. The water valve 7ª is then closed; and the drain valve 8ª fully opened, and the chambers 3ᵇ and 4ª quickly emptied. The ram exhaust-valve 4ʷ, see Fig. 10, is then opened and the member 4 is lowered, leaving the frisket with the formed plate resting upon the chains 1ᵇ, or channel-irons. The chains are then operated to move the frisket with the completed plate outward from between the pressure members; and the perfected plate can then be removed.

The machine as shown is adapted to operate automatically without the necessity of the operator performing any manual operations other than placing the frisket, containing the matrix and plate of plastic material, on the chains 1ᵇ, and then pulling the starting lever of the machine.

As shown in the drawings, the parts are all controlled from one transverse main shaft A, which may be driven, for example, (see Fig. 2) by means of a worm-gear $a$ meshing with a worm $a'$ on a counter-shaft $a^2$, which is suitably journaled in the frame and is driven by beveled gears $a^3$, $b^3$, from a counter-shaft B, on which is a loose pulley $b$ that may be belted to any suitable source of power, and may be locked to the shaft B by a suitable clutch $b'$, when desired. Clutch $b'$ is operable by a lever $b^2$ connected by a rod $b^3$ to a manually operable controlling lever $b^4$, by which the operator can throw the clutch into or out of engagement at will.

The shaft 1 carrying the sprocket wheels 1ª, may be driven from shaft A by means of a gear 1ʳ, on shaft 1, driven by an intermediate train of gears 1ˢ from a gear 1ᵗ on a counter-shaft 1ᵘ which is provided with a delay gear 1ᵛ meshing with a gear 1ʷ on shaft A having a delay face as indicated in Fig. 14. Gears 1ᵛ and 1ʷ are so proportioned that at the proper time gear 1ᵛ will be rotated to transmit sufficient movement to the chains 1ᵇ to cause them to move the frisket 2 from the receiving position, shown in Fig. 1, into pressing position between the press members 3 and 4, as shown in Fig. 8; and then the rotation of gear 1ᵛ is delayed, and the chains 1ᵇ remain at rest until after the completion of the plate forming operation. Then the impression members are separated and the gear 1ᵛ is again actuated so as to operate the chains 1ᵇ and move the frisket from between the pressing members 3 and 4 out to the delivery position.

When the frisket reaches the delivery position the clutch $b'$ is automatically disengaged, and the machine stopped, by means of a pivoted cam $b^8$ mounted on a cam disk 14ʳ attached to the shaft A, and which cam at the proper moment engages with a tooth $b^7$ on a lever $b^6$, pivoted to the frame at one end, and connected at its other end by a link $b^5$ to the lever $b^4$, see Figs. 1 and 3. The cam $b^8$ may be pressed upward by a spring

$b^9$ so that in case the cam should not wholly disengage the tooth $b^7$ before the machine comes to a stop,—the operator can, by throwing lever $b^4$ to the right, clear the tooth from the cam and spring $b^9$ can then throw the cam $b^8$ upward, as indicated in Fig. 3, and the operator can then shift lever $b^4$ to throw the clutch $b'$ into engagement and again start the machine when he so desires.

After the chains $1^b$ have been operated so as to move the frisket into position between the pressing members 3 and 4, the inlet valve $4^v$ of the ram is opened automatically, by means of a cam $4^r$ attached to shaft A; which cam is adapted to operate an oscillating lever $4^q$, which is connected by a rod $4^t$ to the arm $4^u$, see Figs. 1, 2 and 10, so as to open the valve at the proper time. The particular construction of this valve is well known and forms no part of the present invention. The lever $4^q$ may be held up against the cam $4^r$ by means of a spring $4^s$, as indicated in the drawings, or in other suitable manner. The cam $4^r$ is so formed as to hold the ram inlet valve $4^v$ open and maintain the seal during the plate forming operation. After such operation is completed, and before the chains are again moved to shift the frisket; the cam $4^r$ permits lever $4^q$ to be moved by the spring $4^s$ so as to shut off the pressure and open the relief valve $4^w$, and the ram descends letting the pressing members separate.

After the frisket has been brought to the position shown in Figs. 3 and 8 and the pressing members have been closed by the ram; the vacuum valve $5^d$ is operated by a rod $5^h$ attached to an arm $5^g$ on the valve plug $5^t$, and engaging a suitable cam $5^i$ on the shaft A, see Figs. 2 and 15. Cam $5^i$ is so proportioned that at the proper time communication will be established between pipes 5 and $5^c$ and the vacuum apparatus to produce vacuum in chamber $4^a$ and between the matrix and plate as described; and thereafter, prior to the admission of pressure fluid to the chamber $4^a$, the plug $5^f$ will be shifted so as to close communication between pipes $5^c$ and $5^e$, as above described; and at the end of the plate forming operation the vacuum valve will be entirely closed and held closed until another plate is in position to be operated upon.

The air or pressure fluid valve $6^e$ is operable by a rod $6^p$ connected to an arm $6^o$ on the valve stem, and to a lever $6^q$, which is provided with a roller engaging a cam $6^r$ on shaft A, see Figs. 2 and 3. The lever is held against the cam and returned to the valve-closing position by means of a spring $6^s$. The valve $6^r$ is so shaped that the air-valve will be opened and closed at the proper times in the operation of the machine, as above described.

The cooling water-valve $7^a$, is operated by a rod $7^p$, connected to an arm $7^o$ on the valve stem, and to a lever $7^q$ having a roller engaging a cam $7^r$ on the shaft A, the lever being controlled by a spring $7^s$. The cam is shaped so as to open and close the water valve at the proper time in the operation of the machine as above explained.

The drain valve $8^a$ is operable by a rod $8^p$ attached to an arm $8^o$ on the valve stem, rod $8^p$ being connected to a lever $8^q$ engaging a cam $8^r$ on shaft A; said lever being controlled by a spring $8^s$, see Figs. 1, 2 and 3. The cam $8^r$ is adapted to cause the opening and closing of valve $8^a$ at the proper times, and is so proportioned as to first cause a preliminary opening of valve $8^a$, and then fully open it.

The pet-cock or valve $4^j$ is operable at the proper times, by means of a rod $14^p$ attached to an arm $14^o$ on the valve stem and to a lever $14^q$ pivoted on the frame, and engaging a cam $14^r$ on shaft A, see Figs. 1, 2 and 9. Cam $14^r$ is so shaped as to cause the opening and closing of valve $4^j$ at the proper time and in the manner above described.

Obviously race cams might be employed instead of surface cams, and the valve connections could be varied, provided the essential mode of operation of the machine is retained. In some cases one or more of the valves could be operated by hand, but I prefer to make the machine entirely automatic, so as to avoid the possibility of any improper opening or closing of the valves during the operation of the machine and which might result in spoiling the plate.

It is important in practically operating this machine in the process of making printing plates to preliminarily heat the material of which the plate is to be made to a semi-plastic condition before subjecting it to the operation of the machine. For this purpose I provide the frisket, so that a sheet of proper material can be placed thereon and subjected in a suitable oven to a preliminary heating sufficient to soften the material to a plastic condition before it enters the machine. This preliminary heating is important as it enables the machine to be operated very rapidly without injury to the matrix, so that a large number of impressions can be taken from the matrix without injuring the latter.

Operation: A plate can be produced on this machine during each rotation of the shaft A. This shaft may be driven continuously for one complete rotation after it is once started; in other words it is not necessary to stop the machine after the plate is in position for pressing until the plate is completed.

After the frisket with the heated plastic material and matrix is placed on the chains the operator throws clutch $b'$ into engagement with the pulley $b$ and the cycle of operations begin, and is as follows: (1) The chains are shifted to carry the frisket 2, with the heated plate C, between the pressing members 3 and 4, and then come to a stop; (2) the ram inlet valve is then opened by action of cam 4ʳ, and the member 4 is forced upward toward and against the member 3, clamping the frisket and material as above described; (3) during the rise of the ram, the drain valve 8ᵃ is fully closed by the operation of cam 8ʳ; (4) the vacuum valve 5ᵈ is then opened by action of cam 5ⁱ, and a vacuum is produced above the matrix, and between the matrix and the plastic plate, and in chamber 4 as described; (5) then the vacuum valve 5ᵈ is partly shifted, by cam 5ⁱ, so as to close communication between the suction or vacuum apparatus and the chamber 4ᵃ; (6) then the pet-cock or valve 4ʲ is opened for a short period of time by the action of cam 14ʳ so as to relieve the vacuum in chamber 4ᵃ, and then valve 4ʲ is closed; (7) then the air valve 6ᶜ is opened admitting fluid, preferably air, under high pressure into the chamber 4ᵃ, as above described; and the plastic plate C is forced with great pressure upward against the matrix, and obtains its printing surface therefrom; (8) then the air-valve 6ᶜ is closed; and as, or preferably just before, the air valve 6ᶜ is closed the water valve 7ᵃ is opened to supply water to the chamber 4ᵃ and casting 3ᵇ; (9) then the valve 4ʲ is again opened to slightly release the air pressure in the chamber 4ᵃ, as above described, and allow water to flow in under pressure; (10) then the drain valve 8ᵃ is partly opened, allowing a large volume of water to flow rapidly into the chamber 4ᵃ, and casting 3ᵇ, so as to cool or chill the plate quickly on both sides. It will be noted that the plate is cooled on the under side by direct contact of water therewith through the screen 2ᶜ. (11) Then the vacuum valve 5ᵈ, and the water supply valve 7ᵃ are closed; and drain valve 8ᵃ fully opened, permitting the chambers 4ᵃ and 3ᵇ to empty; (12) then the ram pressure valve is closed and its relief-valve opened, and the casting 4 descends freeing the frisket, which remains supported on the irons or chains; and (14) as soon as the frisket is clear the chains are again actuated and move the frisket forward and out from between the presser members to the point of delivery; (15) finally the shaft A having about made one complete rotation the cam bˢ throws clutch b′ out of gear and the machine stops. The machine remains idle until again started in operation by the operator shifting the controlling lever b⁴ to reëngage clutch b′ with pulley b. The aforesaid cycle of operations is repeated for and during each rotation of the shaft A.

The pipe connections between the fixed and movable parts of the apparatus should be either flexible or telescopic, as indicated in the drawings, so that the press may be opened or closed as described without injuring the pipes.

Having described my invention what I claim as new and desire to secure by Letters Patent thereon is:

1. In a matrix forming machine, the combination of means for pressing a plate against a matrix to receive a printing surface therefrom; with means for exhausting air from between the matrix and the plate, and at the back of the plate, prior to the pressing operation, and for continuing suction between the plate and matrix during the pressing operation, and means for relieving the vacuum beneath the plate prior to the pressing operation.

2. In a matrix forming machine, the combination of means for pressing a plate against a matrix to receive a printing surface therefrom; with means for exhausting air from between the back of the matrix and its support, and from between the matrix and the plate, and at the back of the plate, prior to the pressing operation, and for continuing suction between the plate and matrix, and the matrix and its support during the pressing operation, and means for relieving vacuum beneath the plate prior to the pressing operation.

3. In a machine for forming printing plates from plastic material, the combination of press members, one of said members having a recess, means for securing a matrix and plate between said members and over said recess to close the latter, means for introducing pressure fluid into the closed recess to force the plate against the matrix, and means for thereafter introducing cooling fluid into said recess directly against the plate to chill the plate.

4. In a machine for forming printing plates from plastic material, the combination of press members, one of said members having a recess, means for securing a matrix and plate between said members and over said recess to close the latter air-tightly, and means for exhausting air to produce a partial vacuum between the plate and matrix when in position between said members; with means for introducing pressure fluid into the closed recess to force the plate against the matrix, and means for thereafter introducing cooling fluid into the closed recess to chill the formed plate.

5. In a machine for forming printing plates from plastic material, the combination of a pressure chamber, means for securing a matrix and plate in said chamber, and means for exhausting air between the plate and matrix when in position in said chamber; with means for introducing pressure fluid into the chamber to force the plate against the matrix, and means for introducing cooling fluid into said chamber to chill the plate after the pressing operation.

6. In a machine for forming printing plates from plastic material, the combination of opposed press members, one of said members having a recess, means for securing a matrix and plate between said members and over said recess to close the latter, and means for exhausting air between the plate and matrix when in position between said member; with means for introducing fluid into the closed recess to force the plate against the matrix, and means for thereafter introducing cooling fluid into said recess to chill the formed plate.

7. In an apparatus for forming printing plates, the combination of opposed press members, a frisket, a matrix and plate adapted to be placed between said members, means for causing the members to clamp and inclose the frisket securely therebetween, and means for admitting fluid pressure into the inclosure and beneath and against the plate to force the latter against the matrix.

8. In an apparatus for forming printing plates, the combination of opposed press members, a frisket adapted to be placed between said members, a matrix and plate interposed between the frisket and one member, means for causing the members to clamp the frisket securely therebetween, and means for admitting fluid pressure into the frisket beneath and against the plate to force the latter against the matrix.

9. In a machine for forming printing plates, the combination of opposed press members, a frisket, a matrix and plate adapted to be placed between said members, means for causing the members to clamp frisket, matrix and edges of the plate securely therebetween, means for exhausting the air between the plate and matrix, and between the matrix and adjacent press member prior to the final pressing operation, and means for admitting fluid pressure beneath the plate to force the latter against the matrix.

10. In an apparatus for forming printing plates, the combination of opposed press members, a frisket adapted to be placed between said members, a matrix and plate interposed between one side of the frisket and one member, means for causing the members to clamp the frisket securely therebetween, means for producing a partial vacuum between the plate and matrix and between the matrix and adjacent pressing member prior to the final pressing operation, and means for admitting fluid pressure into the frisket beneath the plate to force the latter against the matrix.

11. In a machine for forming printing plates, the combination of opposed press members, a frisket matrix and plate adapted to be placed between said members, and means for causing the members to clamp the frisket securely therebetween; with means for admitting fluid pressure beneath the plate to force the latter against the matrix, and means for introducing cooling fluid to chill the plate after the pressing operation.

12. In a machine for forming printing plates, the combination of opposed press members, a frisket adapted to be placed between said members, a matrix and plate interposed between one side of the frisket and the adjacent member, and means for causing the members to clamp the frisket securely therebetween; with means for exhausting air from between the plate and matrix, means for admitting fluid pressure under the plate to force the latter against the matrix, and means for thereafter introducing cooling fluid to chill the plate.

13. In an apparatus for forming printing plates, the combination of opposed press members, a frisket matrix and plate, and means for causing the members to clamp the frisket, matrix and plate securely therebetween; with means for producing partial vacuum between the plate and matrix and between the matrix and adjacent press member prior to the pressing operation; means for admitting fluid pressure beneath the plate to force the latter against the matrix; and means for introducing cooling fluid to chill the plate after the pressing operation.

14. In an apparatus for forming printing plates, the combination of opposed press members, a frisket adapted to be placed between said members, a matrix and plate interposed between one side of the frisket and the adjacent member, and means for causing the members to clamp the frisket securely therebetween; with means for producing partial vacuum between the plate and matrix, and between the matrix and adjacent press member prior to and during the pressing operation; means for admitting fluid pressure into the frisket beneath the plate to force the latter against the matrix; and means for introducing cooling fluid to chill the plate after the pressing operation.

15. In a machine for making printing plates from plastic material, the combination of opposed press members, one of said members having a recess in its operating face, a frisket adapted to be placed on the recessed member, a matrix interposed between said frisket and the other press member, the plate of flexible material from which the printing plate is to be formed being placed on the frisket opposite said matrix; with means for causing said members to clamp the frisket therebetween, and means for introducing fluid under pressure into said recess and directly against the plate.

16. In a machine for making printing plates from plastic material, the combination of opposed press members, one of said members having a recess in its operating face, a frisket, adapted to be placed on the recessed member, having an opening communicating with the recess, a matrix interposed between said frisket and the other press member, the plate of flexible material from which the printing plate is to be formed being placed on the frisket opposite said matrix; with means for forcibly pressing said members together to clamp the frisket therebetween, means for exhausting air from between the matrix and plate prior to the pressing operation, and means for introducing fluid under pressure into said recess so as to force the plate against the matrix.

17. In a machine for making printing plates from plastic material, the combination of opposed press members, one of said members having a recess in its operating face, a frisket adapted to be placed on the recessed member having an opening communicating with the recess in said member, a matrix interposed between said frisket and the other press member, the plate of flexible material from which the printing plate is to be formed being placed on the frisket opposite said matrix; with means for forcibly pressing said members together to clamp the frisket therebetween, means for exhausting air from between the matrix and plate and from between the back of matrix and adjacent press member prior to and during the pressing operation, and means for introducing fluid under pressure into said recess so as to force the plate against the matrix.

18. In a machine for making printing plates, the combination of opposed press members, a frisket adapted to be clamped between said members, a matrix interposed between said frisket and one member, the plate of flexible material from which the printing plate is to be formed being placed on the frisket opposite said matrix; with means for forcibly pressing said members together to clamp the frisket and matrix therebetween, means for introducing fluid under pressure into said frisket and directly against the plate to force the latter against the matrix, means for exhausting the pressure fluid, and means for admitting cooling fluid to chill the plate.

19. In a machine for making printing plates, the combination of opposed press members, one of said members having a recess in its operating face, a matrix interposed between said members, the plate of flexible material from which the printing plate is to be formed being placed over the recess and opposite said matrix; with means for causing said members to clamp the matrix and plate therebetween, means for introducing fluid under pressure into said recess so as to force the plate against the matrix, and means for exhausting fluid from the recess and admitting cooling fluid thereinto to chill the plate.

20. In a machine for making printing plates, the combination of opposed press members, one of said members having a recess in its operating face, a frisket adapted to be placed on the recessed member, a matrix and the plate of plastic material interposed between said frisket and the other press member; with means for forcibly compressing said members together to clamp the frisket, matrix and plate therebetween, with means for producing a partial vacuum between the matrix and plate and between the back of matrix and adjacent pressing member prior to and during the pressing operation, means for exhausting air in the recess prior to the pressing operation; means for introducing fluid under pressure into said recess so as to force the plate against the matrix, and means for thereafter admitting cooling fluid to chill the plate.

21. In an apparatus for forming printing plates, a press member having grooves in its face adapted to be covered by the matrix, and means for exhausting air from said grooves prior to the plate forming operation.

22. In an apparatus for forming printing plates, the combination of a matrix, a press member against which the matrix is adapted to be placed having grooves in its face adapted to be covered by the margins of the matrix, and means for exhausting air from said grooves prior to the plate forming operation.

23. In an apparatus for forming printing plates, a press member having grooves in its face adapted to be covered by the matrix, and means for exhausting air from said grooves prior to the pressing operation, in combination with a matrix having incisions in its margins adapted to register with the grooves in the press member whereby air may be exhausted from between the matrix and plate prior to the forming operation.

24. A frisket for the purpose specified having a shoulder upon which the material for the plate is supported, said shoulder having minute grooves adapted to form an air-tight seal when the frisket and plate are clamped in the press.

25. A frisket for the purpose specified having shoulders upon which the material for the plate is supported when the frisket and plate are in the press, and a screen suspended between the shoulders to support the central portion of the plate and through which the operative fluid can contact the plate.

26. A frisket for the purpose specified comprising a rabbeted frame upon which the material for the plate is supported, said rabbet having minute grooves adapted to form an air-tight seal when the frisket and plate are clamped in the press, and a screen suspended between the rabbet to support the central portion of the plate and through which the operative fluid can contact the plate.

27. In apparatus for forming printing plates, the combination of opposed press members, a frisket interposed between said members and having a screen adapted to support the material for the printing plate prior to the formation thereof, and a matrix; with means for causing the members to clamp the frisket and matrix tightly therebetween, and means for admitting pressure fluid between the pressing members and through the screen against the back of the plate to force the same against the matrix.

28. In apparatus for forming printing plates, the combination of opposed press members, a frisket interposed between said members and having a screen adapted to support the material for the printing plate prior to the formation thereof, and a matrix; with means for causing the members to clamp the frisket and matrix tightly therebetween, means for admitting pressure fluid between the press members and through the screen against the back of the plate to force the same against the matrix, means for exhausting the pressure fluid, and means for admitting chilling fluid directly against the back side of the plate while the plate and matrix are locked together.

29. In apparatus for forming printing plates, the combination of opposed press members, one of said members having minute channels in its face adapted to be covered by the matrix, a frisket interposed between said members and having a screen adapted to support the material for the printing plate prior to the formation thereof, and a matrix interposed between the frisket and grooved press member; with means for causing the members to clamp the frisket and matrix, means for exhausting air from the said grooves, and means for admitting pressure fluid between the press members and through the screen against the back of the plate to force the same against the matrix.

30. In apparatus for forming printing plates, the combination of opposed press members, one member having minute channels in its upper side adapted to be covered by the margins of the matrix, a frisket interposed between said members and having a screen adapted to support the material for the printing plate prior to the formation thereof, and a matrix interposed between the frisket and grooved press member; with means for causing the members to clamp the frisket and matrix, means for exhausting air from the said grooves, means for admitting pressure fluid between the press members and through the screen against the back of the plate to force the same against the matrix, means for exhausting the pressure fluid, and means for admitting chilling fluid directly against the back of the plate while the plate and matrix are locked together.

31. An apparatus for forming printing plates, comprising opposed press members, a plate and matrix interposed between said members, a screen adapted to support the material for the printing plate prior to the formation thereof; and means for causing the members to clamp the frisket and matrix tightly therebetween; with means for exhausting air from between the plate and matrix, at the back of the matrix, and at the back of the plate prior to the application of the pressure fluid, and for maintaining suction between the plate and matrix and at the back of the matrix during the pressing operation, and means for admitting pressure fluid through the screen against the back of the plate to force the same against the matrix.

32. In apparatus for forming printing plates, the combination of opposed press members, a frisket interposed between said members and having a screen adapted to support the material for the printing plate prior to the formation thereof, a matrix, and means for causing the members to clamp the frisket and matrix tightly therebetween; with means for exhausting air from between the plate and matrix, at the back of the matrix, and at the back of the plate prior to the application of the pressure fluid, and for maintaining suction between the plate and matrix and at the back of the matrix during the pressing operation; means for admitting pressure fluid through the screen against the back of the plate to force the same against the matrix, and means for exhausting the pressure fluid and admitting chilling fluid directly against the back of the plate and while the plate and matrix are locked together.

33. In apparatus for the manufacture of printing plates, the combination of press members, a frisket adapted to support the matrix and plate; endless carriers for the frisket, automatic means for operating said carriers so as to move the frisket between said press members, allow it to remain during the pressing operation, and thereafter remove the frisket and formed plate from between the press members.

34. In apparatus for the manufacture of printing plates, the combination of press members, a frisket adapted to support the plate, endless carriers for moving the frisket, means for operating said carriers to move the frisket between said press members, allow it to remain during the pressing operation, and thereafter remove the frisket and plate from between the press members; with mechanism for automatically operating said carriers, means for operating the press members, and means for causing the formation of the plate while the frisket is between the press members.

35. In apparatus for forming printing plates, the combination of opposed press members, a screen interposed between said members and adapted to support the material for the printing plate prior to the formation thereof, and a matrix opposite the screen; with means for admitting fluid under pressure through the screen against the back of the plate to force the same against the matrix.

36. In apparatus for forming printing plates, the combination of opposed press members, a screen interposed between said members and adapted to support the material for the printing plate prior to the formation thereof, and a matrix opposite the screen; with means for causing the members to clamp the edges of the matrix and plate tightly, and means for admitting pressure fluid between the press members and through the screen against the back of the plate to force the same against the matrix.

37. In apparatus for forming printing plates, the combination of opposed press members, a screen interposed between said members and adapted to support the material for the printing plate prior to the formation thereof, and a matrix opposite the screen; with means for admitting fluid under pressure through the screen against the back of the plate to force the same against the matrix; means for exhausting the pressure fluid, and means for admitting chilling fluid directly against the back side of the plate while the plate and matrix are locked together.

38. In apparatus for forming printing plates, the combination of opposed press members, one of said members having a recess, a screen interposed between said members and adapted to support the plate prior to the formation thereof, and a matrix above the plate; with means for causing the members to clamp the margins of the matrix and plate tightly, means for exhausting air from between the matrix and plate, and means for admitting pressure fluid into said recess and through the screen against the back of the plate to force the same against the matrix.

39. In apparatus for forming printing plates, the combination of opposed press members, one member having a recess adapted to be covered by the matrix, a screen interposed between said members and adapted to support the plate prior to the formation thereof, and a matrix interposed between the plate and opposed press members; with means for causing the members to clamp the margins of the matrix and plate, means for admitting pressure fluid into said recess and through the screen against the back of the plate to force the same against the matrix, means for exhausting the pressure fluid, and means for admitting chilling fluid into said recess while the plate and matrix are locked together.

40. In an apparatus for forming printing plates, the combination of a press with a plate and a matrix having incisions in its margins through which air can be exhausted from between the matrix and plate when they are in the press.

41. In an apparatus for forming printing plates, the combination of a press, a screen adapted to support the plastic plate in the press prior to its formation, and through which the pressure fluid can operate against the plate while in the press; and means for admitting pressure fluid to the press.

42. In an apparatus for forming printing plates, the combination of a press, a frisket frame, and a screen in said frame adapted to support the plastic plate while in the press prior to its formation, and means for admitting pressure fluid through the screen directly against the plate while in the press.

43. In a plate forming machine, the combination of means for pressing a plate of plastic material against a matrix to receive a printing surface therefrom; with means for exhausting air between the opposed faces of the matrix and the material prior to the pressing operation, and for continuing suction between the matrix and material while the latter is forcibly pressed against the matrix, and means for applying liquid pressure to the back of the material to form the plate.

44. In a machine for forming printing plates from plastic material, the combination of press members, one of said members having a recess, means for securing a matrix and plate between said members and over said recess to close the latter, means for producing partial vacuum between the opposed faces of the plate and matrix, when in position between said members, prior to and during the formative operation; and means for introducing pressure fluid into the closed recess to force the plate against the matrix.

45. In an apparatus for making printing plates from plastic material, the combination of means for pressing a plate against the matrix by directly applied fluid pressure, and means for cooling the plate by admitting cooling fluid directly against the back of the formed plate after it has been pressed and while locked to the matrix.

46. In an apparatus for making printing plates from plastic material, the combination of means for pressing a preliminarily heated plate against the matrix by directly applied fluid pressure; with means for cooling the formed plate by admitting cooling fluid directly against the back of the formed plate; and means for also applying cooling fluid indirectly to the back of the matrix.

In testimony that I claim the foregoing as my own, I affix my signature in presence of two witnesses.

MICHAEL A. DROITCOUR.

Witnesses:
JAMES R. MANSFIELD,
L. E. WITHAM.